(No Model.) 2 Sheets—Sheet 2.

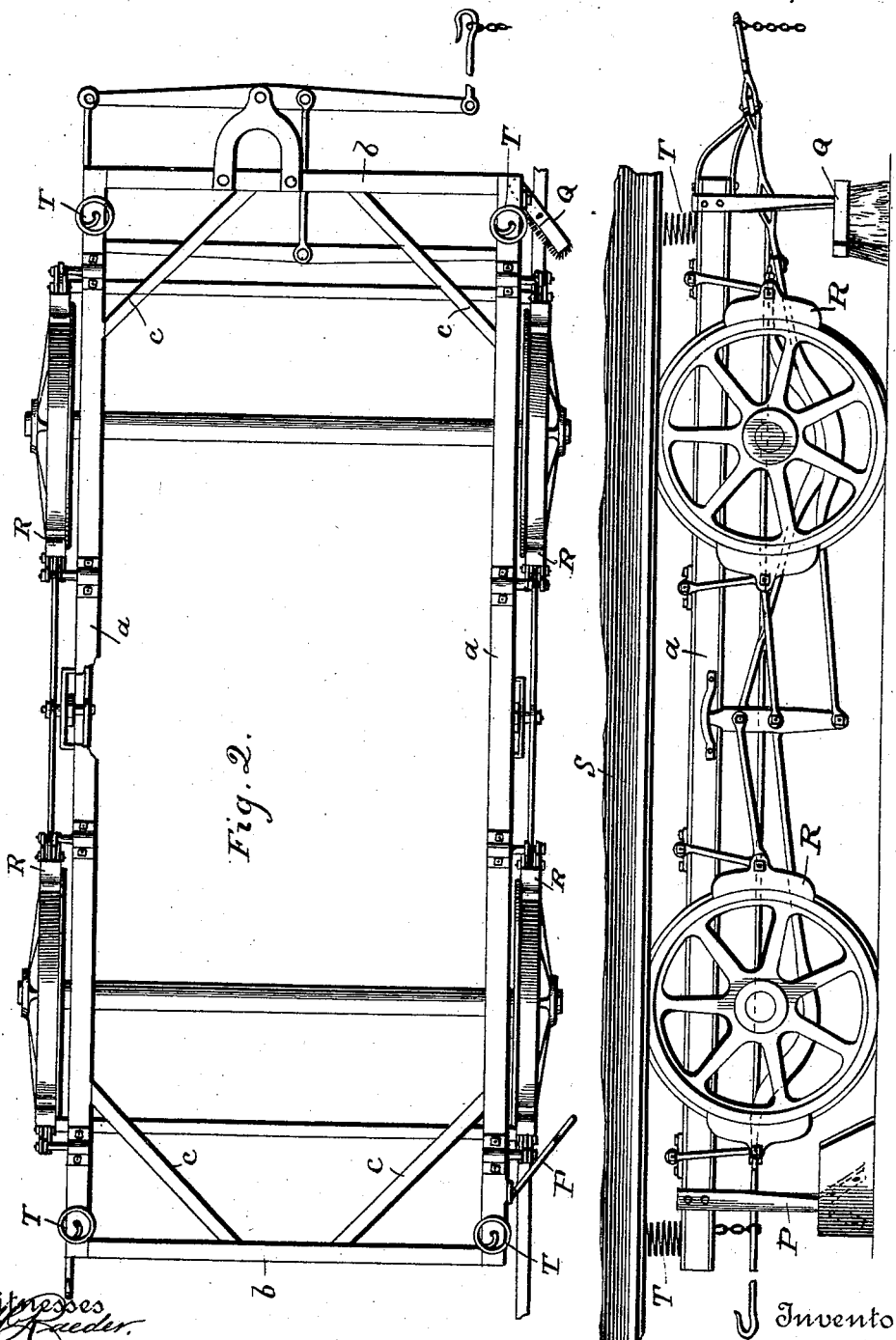

W. JOSLIN.
TRUCK FOR STREET RAILWAYS.

No. 415,112. Patented Nov. 12, 1889.

Witnesses
Inventor
William Joslin
By his Attorneys

UNITED STATES PATENT OFFICE.

WILLIAM JOSLIN, OF CLEVELAND, OHIO.

TRUCK FOR STREET-RAILWAYS.

SPECIFICATION forming part of Letters Patent No. 415,112, dated November 12, 1889.

Application filed August 27, 1889. Serial No. 322,102. (No model.)

*To all whom it may concern:*

Be it known that I, WILLIAM JOSLIN, a citizen of the United States, residing at Cleveland, in the county of Cuyahoga and State of Ohio, have invented certain new and useful Improvements in Trucks for Street-Railways; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to car-trucks, and has for its object to equip the said truck with the brakes, brake supporting and operating devices, brushes and scrapers for cleaning the track, and with the motors independent of the car-body. By this arrangement the several parts maintain a fixed relation relative to each other, and the truck and the car-body are free to move to relieve the jolting. The car-body is connected by springs with the truck and is free to yield in any direction, thereby making riding easy. Another feature is the axle-bearing or oil-box, which is constructed to slip on the I-beam of the truck-frame and held in place by keys.

Figure 3:
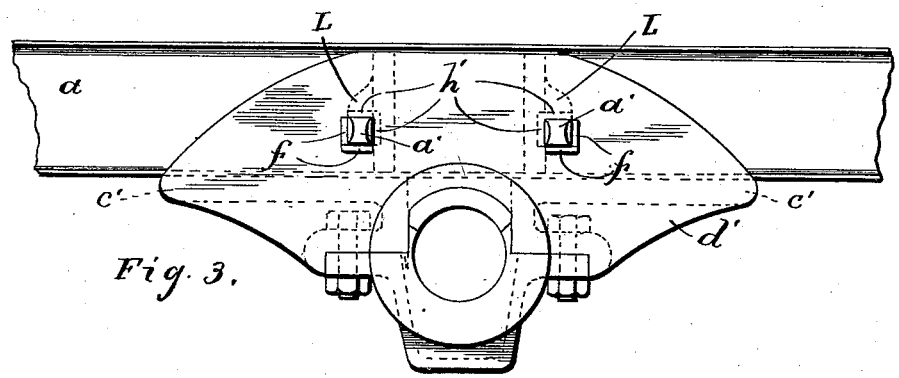
Figure 4:
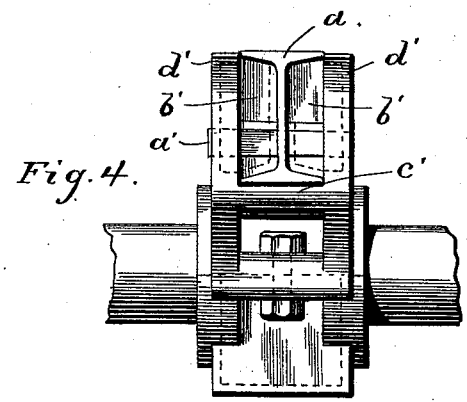
Figure 5:
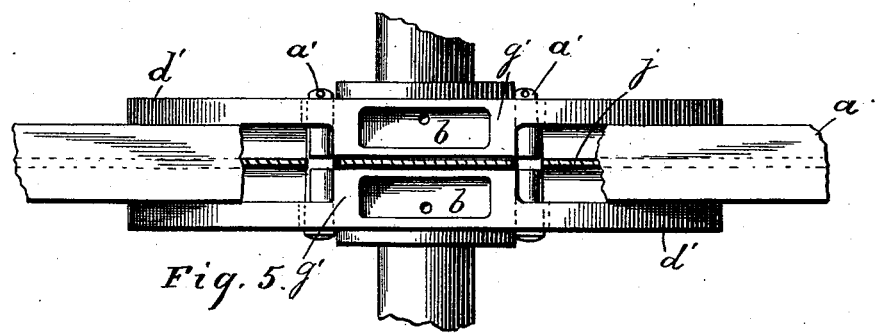

In the drawings, Figure 1 is a side view of a truck embodying my invention. Fig. 2 is a top plan view of the truck. Fig. 3 is a side view of the oil-box and a portion of the truck-frame on an enlarged scale. Fig. 4 is an end view of the oil-box and I-beam, showing a portion of the axle. Fig. 5 is a top plan view of the oil-box, showing the upper portion of the I-beam broken away.

The truck comprises the side I-beams $a\ a$, end bars $b\ b$, and the angle-braces C C, so constructed that any of the corners of the truck-frame can rise and fall to adapt it to the inequalities of the rails or track and obstacles that may be on the track. The scraper P at one end of the truck and the brush Q at the other end are secured to the truck-frame in any convenient manner. The brake-shoes R and their supporting and operating devices are carried by the truck independent of the body of the car.

The car-body S is supported on the truck by the springs T, which are placed near the ends of the truck, thereby causing the car to ride easy and steady. This effect is obtained because the greater part of the weight of the car-body and passengers is between the springs near the outer ends of the truck-frame, thereby preventing the ends of the car-body from oscillating or moving up and down, as with the common four-wheel street-car.

The box (shown most clearly in Figs. 3, 4, and 5) is so constructed and cast as to slide onto the I-beam with an easy fit and then keyed fast to the I-beam at proper places to fit upon the axles of the truck. The keys $a'\ a'$ are so constructed as to press against each end of the oil-boxes $b'\ b'$, as shown in Figs. 4 and 5, at the same time to press the I-beam down upon the connecting-web $c'$ of the box-flanges $d'\ d'$ in Fig. 4 and $d'\ d'\ d'\ d'$, Fig. 5. The spaces $ff$ in Fig. 3 show spaces on the lower and outer sides of the keys through the flanges $d'\ d'$ in Fig. 3 and $d'\ d'$ in Fig. 4. The dotted lines $h'\ h'$ in Fig. 3 show spaces in central web of the I-beam on the upper and inner sides of the keys. It will be readily seen that by this arrangement of the keys and spaces through the I-beam and flanges $d'\ d'$ of the box that the keys $a'\ a'$ will be forced against the outer sides of the oil-boxes $b\ b$ and down upon the central web $j$ of the I-beam, thereby holding the I-beam and box firmly together. The dotted lines L L in Fig. 3 and the projections L L L L in Fig. 5, on the outside of the oil-boxes, show projections cast onto the outside of the oil-boxes $b\ b$ and inner sides of the box-flanges $d'\ d'\ d'\ d'$, Fig. 5.

The keys slide under the projections L L L L, thus preventing the keys from springing or bending when pressing down upon the web $jj$ of the I-beam.

Having thus described my invention, what I claim as new, and desire to secure by Letters Patent, is—

1. The hereinbefore-described car-truck, composed of the side beams $a\ a$, end bars $b\ b$, connecting the side beams, the angle-braces $c\ c\ c\ c$, the brake-shoes and their supporting and operating devices suspended from the side beams $a$, the scraper P at one end of the side beam and the brush Q at the opposite end of the side beam, and the springs T at the four corners of the truck-frame, placed on the ends of the side beams and adapted to support the car-body, substantially as and for the purpose described.

2. The combination, with the I-beam of the truck, of the box slipped onto the I-beam and held thereon by keys, substantially as described.

3. The combination, with the I-beam and the box slipped on the said I-beam, having flanges $d'$ $d'$, of the keys $a'$, inserted through openings in the said flanges $d'$ $d'$ and the web of the I-beam, spaces $f$ being left between the lower and outer sides of the keys and the key-openings in the flanges $d'$, and spaces $h'$ being left between the upper and inner sides of the keys and the key-openings in the web of the I-beam, substantially as and for the purpose described.

4. The combination, with the I-beam and the flanged box slipped on the I-beam and having the ribbed projections L L, of the keys $a'$, passing through the flanges of the box and web of the beam and beneath the ribs L, substantially as described.

In testimony whereof I affix my signature in presence of two witnesses.

WILLIAM JOSLIN.

Witnesses:
  S. A. TERRY,
  WILL MUIRHEAD.